UNITED STATES PATENT OFFICE.

ERNST GRETHER, OF DETROIT, MICHIGAN, ASSIGNOR, BY MESNE ASSIGNMENTS, TO ADAM BETZING, OF DETROIT, MICHIGAN.

3.4-DIOXYPHENYL-1-ALKYLENDIAMIN-1.2 AND PROCESS OF MAKING SAME.

1,051,577.  Specification of Letters Patent.  Patented Jan. 28, 1913.

No Drawing.  Application filed July 16, 1906. Serial No. 326,301.  (Specimens.)

*To all whom it may concern:*

Be it known that I, ERNST GRETHER, a subject of the Emperor of Germany, residing at Detroit, in the county of Wayne and State of Michigan, have invented certain new and useful Improvements in 3.4-Dioxyphenyl-1-alkylendiamin-1.2 and Processes of Making Same, of which the following is a specification.

This invention relates to substances having blood pressure raising properties that are obtained by reduction from 3.4-dioxyphenylglyoxims which form the subject matter of a renewed prior application Serial No. 671565. If these last named substances which correspond to the general formula $$\text{(3,4-dihydroxyphenyl ring with } C_8H_{2.}O_2N_2)$$

are subjected to reduction with a suitable amalgam (sodium, potassium or aluminium amalgam) in presence of acids new products which may be called 3.4-dioxyphenyl-1-alkylendiamin-1.2, are obtained which correspond conjecturally to the formula.

$$\text{(3,4-dihydroxyphenyl ring with } -\text{C(H)(alkylamin)}-NH_2)$$

These new products possess in a marked degree the property of increasing the pressure of blood similar to adrenalin and while equally effective are less toxic than the latter.

The following example illustrates how the invention may be practised: 20 g. of the 3.4-dioxyphenylglyoxim are dissolved in 4000 g. warm water and while being cooled with ice are reduced with 145 g. sodium amalgam of 2.91% of sodium and 77 g. of hydrochloric acid of 10.5% strength. The addition of the sodium amalgam and the hydrochloric acid is made in small portions during about 2½ hours the solution being kept slightly acid all the time and vigorously stirred up. After the fluid is decanted from the mercury it is neutralized with sodium bicarbonate, litmus being used as an indicator.

By diluting the liquid to about 600 cc. a solution of the active substance is obtained which is applicable without further manipulation and according to physiological tests produces results on a par with that of adrenalin in a 1:1000 solution.

Instead of the hydrochloric acid other acids may be substituted but the use of the former is especially appropriate as it gives rise to the formation of sodium chlorid the presence of which is desirable for subcutaneous use and for imparting greater stability to the solution.

The effective bases have as yet not been obtained in a free state. The color of the acid solution is colorless to yellow, it produces with ferric chlorid in very diluted form an intense green color, and by the addition of free alkali the color of the solution turns to brown. In its physiological effect it behaves like adrenalin by contracting the blood vessels and it also reduces the toxic action of local anesthetics when injected therewith. Similarly effective products are obtained by reduction with amalgam of the 3.4-dioxyphenylmethylglyoxim described in the above mentioned application Serial No. 671565.

What I claim is:—

1. The process of making a 3.4-dioxyphenyl-1-alkylendiamin-1.2 which consists in subjecting 3.4-dioxyphenyl-1-glyoxims to reduction with suitable metal amalgams in presence of acids substantially as described.

2. The process of making a 3.4-dioxyphenyl-1-alkylendiamin-1.2 which consists in subjecting 3.4-dioxyphenyl-1-glyoxims to reduction with sodium amalgam in presence of hydrochloric acid, substantially as described.

3. As a new product the 3.4-dioxyphenyl-1-alkylendiamin corresponding to the formula.

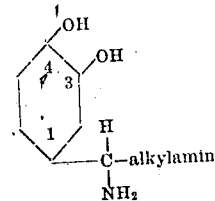

in which the two amin groups are attached to adjacent carbon atoms, and which is in the form of a salt solution the active principle or base of which has blood pressure raising qualities and which is characterized by being colorless to yellow, producing with ferric chlorid in a diluted form an intense green color, and with the addition of a free alkali a brown color.

In testimony whereof I affix my signature in presence of two witnesses.

ERNST GRETHER.

Witnesses:
OTTO F. BARTHEL,
CHAS. B. SHUMWAY.